A. W. FOSTER, Jr.
PIPE-JOINTS.
No. 190,965. Patented May 22, 1877.
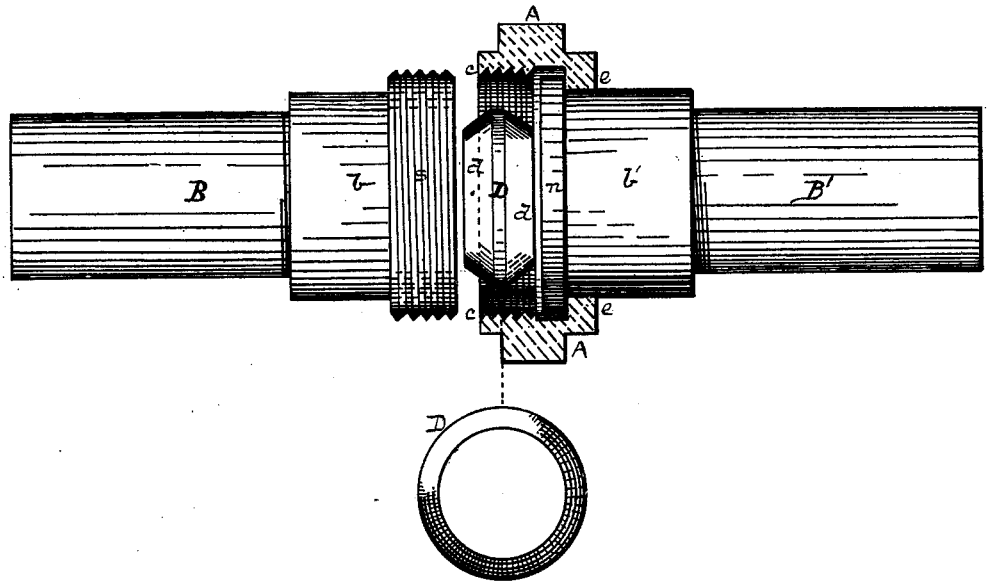
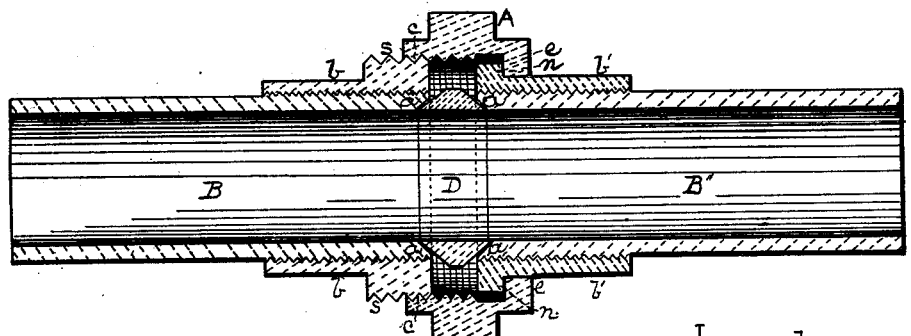
Witnesses
Y. C. Christy
O. L. Parker
Inventor
Alexander W. Foster Jr.
by George H. Christy
Atty.

UNITED STATES PATENT OFFICE.

ALEXANDER W. FOSTER, JR., OF PITTSBURG, PENNSYLVANIA.

IMPROVEMENT IN PIPE-JOINTS.

Specification forming part of Letters Patent No. 190,965, dated May 22, 1877; application filed December 6, 1876.

*To all whom it may concern:*

Be it known that I, ALEXANDER W. FOSTER, Jr., of Pittsburg, county of Allegheny, State of Pennsylvania, have invented or discovered a new and useful Improvement in Pipe-Joints; and I do hereby declare the following to be a full, clear, concise, and exact description thereof, reference being had to the accompanying drawing, making a part of this specification, in which—like letters indicating like parts—

Figure 1 shows the several parts which go to make up my improvement detached, but with the coupling-nut in section, and the packing-ring also in end view; and Fig. 2 shows a sectional view of the same parts united, or with the pipes coupled.

In ordinary screw-joint pipe-couplings the tightness of the joint depends commonly on the tightness of the screw-threads, and hence a comparatively long thread is required, and the joint has to be screwed up so tight that, after rusting, it can be unscrewed only with great difficulty, and often not at all; also, such joints are exceedingly apt to leak. India-rubber gaskets, packing-rings, &c., have been used as an additional means of securing a tight joint, but its destructible qualities render it objectionable.

In my present improvement I employ a metallic packing-ring, tapering or cone shaped at each end, in combination with a bell-mouthed or flaring end to each pipe, and any suitable appliances for uniting the pipes.

At B B' I have shown two pipe ends, which are to be jointed. A is a coupling-nut, and D is the metallic packing-ring. This ring D has the same, or about the same, bore as the pipe, but exteriorly it is made cone-shaped at each end, as shown at $d\ d$. The mouth of each pipe B B' is reamed out to a flaring or bell-mouth shape, as shown at $a\ a$, the slope of the flare being the same, or about the same, as the slope of the face of the cone of the ring D, but preferably of a slightly different slope, as shown in Fig. 2, so that the first engagement will be at the ends of the cones and the bases of the flaring mouths, or vice versa, in which case the thinner parts of the materials employed will yield sufficiently, on the nut being screwed up, to allow the surfaces to come into close contact all around, and thereby make a tight joint; but by turning the cones and flares true, and both sloping to the same angle, a sufficiently-tight joint may be secured with no resort, or but a limited resort, to the yielding and elastic properties of the metals employed.

For drawing the pipes and ring into close contact any suitable union may be employed—such as a flange-union with bolts and nuts, a bayonet-joint union, or other device of like function, one such being represented for purposes of illustration. Onto the end of the pipe B is screwed a sleeve, $b$, with a thread, $s$, cut on its outer face. Onto the adjacent end of the pipe B' is screwed a sleeve, $b'$, having a collar, $n$, on its end. The coupling-nut A has an inwardly-projecting flange, $e$, at one end, to engage the collar $n$, and a thread, $c$, at the other to screw onto the thread $s$. The union is effected in the usual way; but the collar $n$ may be made directly on the end of the pipe B', and the screw-thread $s$ on the end of the pipe B, with a like operation, the coupling-nut being correspondingly reduced in size.

It will now be seen that no particular accuracy in the union fittings is required, nor need they have a long length of engagement, to secure a tight joint, since the latter function is secured by means of the metallic packing-ring in its described relation to the flaring mouths of the pipe, when used with any suitable coupling or union.

I am aware of the lead-pipe joint described in patent to Hugh Guyer, of September 18, 1876, but the efficiency of such joint depends on the clamping and compression of the plastic lead between two inclined surfaces. As the couplings are loose on the pipe, there is no drawing of the pipes toward each other. In my improvement, which relates only to iron or other hard-metal pipes, the effectiveness of the joint results wholly from the endwise drawing of the reamed-out pipes against the conical ends of the metallic packing-ring. The two joints differ in the material that constitutes the joint, in the construction of the means for coupling, and in the operation or manner of securing the result.

The use of flexible packing-rings, which depend for the efficiency on the fluid-pressure inside, is also disclaimed.

I claim herein as my invention—

In jointing hard-metal pipes, a coniformed reamed-out mouth at the end of each pipe, an intermediate metallic conically-ended packing-ring, and coupling devices, rigidly attached to, or made on, the pipe, substantially as set forth.

In testimony whereof I have hereunto set my hand.

ALEXANDER W. FOSTER, Jr.

Witnesses:
  J. J. McCORMICK,
  CLAUDIUS L. PARKER.